Jan. 13, 1959    H. C. FLINT    2,868,276
FORMED SPRING CUSHION CONSTRUCTION
Filed Dec. 1, 1955    2 Sheets-Sheet 1
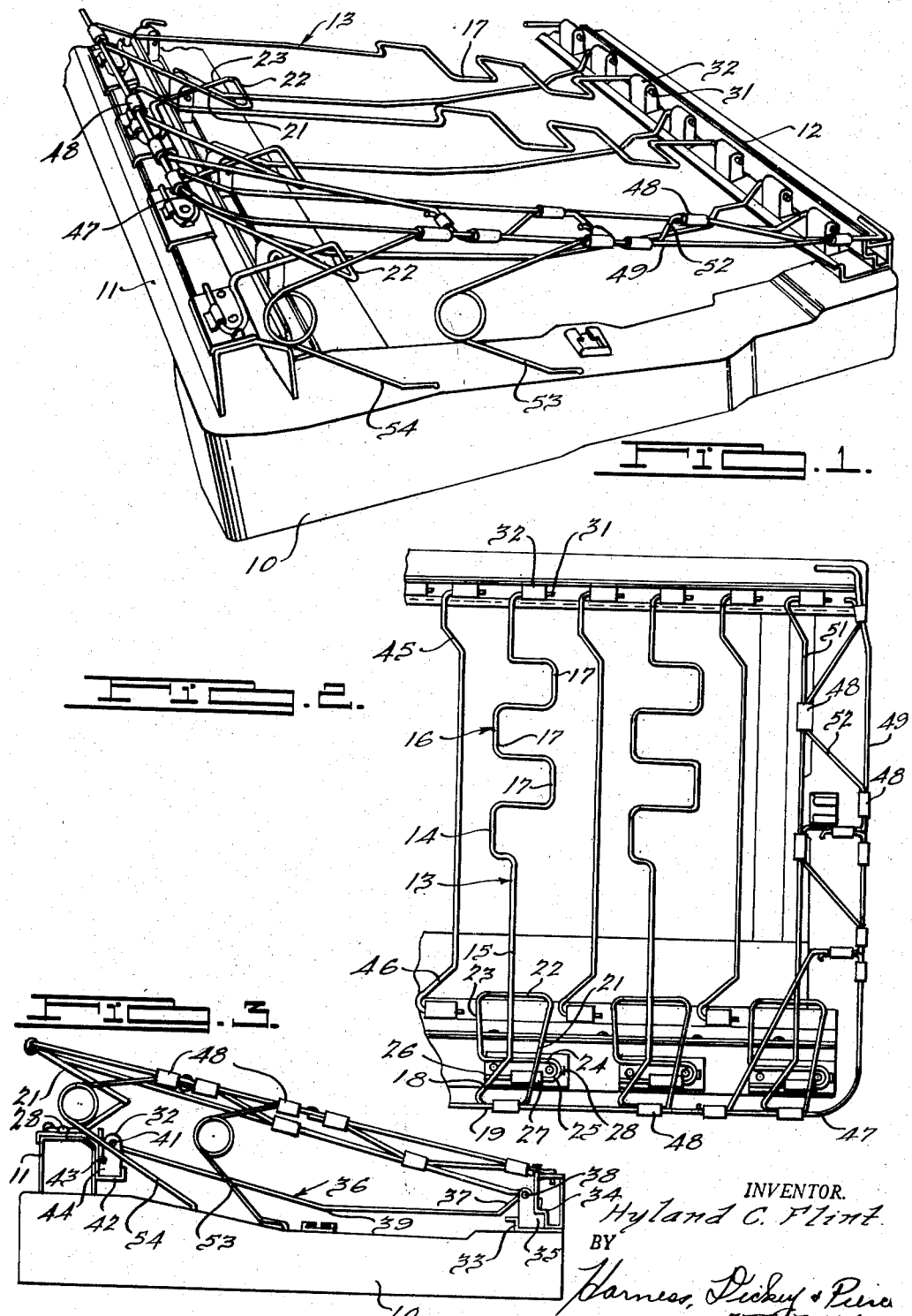
INVENTOR.
Hyland C. Flint.
BY
Harness, Dickey & Pierce
ATTORNEYS Jan. 13, 1959

H. C. FLINT 2,868,276

FORMED SPRING CUSHION CONSTRUCTION

Filed Dec. 1, 1955

INVENTOR.
Hyland C. Flint.
BY
Harness, Dickey & Pierce.
ATTORNEYS.

United States Patent Office 2,868,276
Patented Jan. 13, 1959

2,868,276

FORMED SPRING CUSHION CONSTRUCTION

Hyland C. Flint, Birmingham, Mich., assignor to American Metal Products Company, Detroit, Mich., a corporation of Michigan Application December 1, 1955, Serial No. 550,360

14 Claims. (Cl. 155—179)

This invention pertains to springs, and particularly to spring strips of the formed wire type and the assembly thereof on a frame.

Heretofore sinuous formed wire was employed as spring elements made in continuous lengths and formed to provide oppositely disposed loops joined by straight portions. Difficulty was experienced with this type of strip since it had the same characteristic at all points throughout its length and the proper contour to the load bearing section of the strip when loaded was not obtained.

The present invention pertains to spring strips having load bearing sections of straight wire or of straight wire having a minimum number of oppositely disposed loops therein, with the front portion extending downwardly beneath the front end and shaped as a V to support the front end of the load bearing section above the frame and to provide resiliency therefor. The rear frame member is provided with upwardly extending blocks of rubber or similar resilient material which may deflect forwardly when the load bearing section of the spring is loaded. Additional wires may be employed beneath the load bearing area of the spring strips, having the rear end mounted in the rubber blocks and the front end pivotally mounted so as to be in position to assist in supporting the load when the load bearing sections of the springs deflect sufficiently to have the lower wires engaged by the load. In such an arrangement, a spring cushion is provided which has shallow depth while providing desired load supporting characteristics so that they may be applied to an automobile in which the top has been lowered relative to the floor.

Accordingly, the main objects of the invention are: to provide a spring strip having a straight wire section or a straight section having a minimum number of loops therein forming the load bearing portion of the spring strip; to provide a spring having a substantially straight portion for supporting a load and a portion extending downwardly at the front end and formed to provide a V-shaped support therefor; to mount a plurality of springs across the front and rear members of a seat frame, with the end of the V front portion secured against rotation and the rear portion mounted in an upwardly extending rubber block which may tilt forwardly when the load bearing section of the spring is loaded; to mount wire sections beneath the load bearing sections of the assembled spring strip, with the rear end supported on upwardly extending forwardly tiltable rubber blocks which assist in supporting the load when the load bearing spring strips are deflected a predetermined amount to provide a cushion made of springs containing a minimum length of wire, with the rear ends mounted in upwardly extending blocks and with resiliently mounted wires therebelow to assist the load bearing section when deflected a predetermined amount under load, and in general, to provide a spring strip and an assembly thereof which is simple in construction and economical in manufacture.

Other objects and features of novelty of the invention will be specifically pointed out or will become apparent when referring, for a better understanding of the invention, to the following description taken in conjunction with the accompanying drawings, wherein:

Figure 1 is a broken perspective view of a seat cushion having springs therein embodying features of the present invention;

Fig. 2 is a plan view of the spring cushion illustrated in Fig. 1;

Fig. 3 is a view in side elevation of the spring cushion illustrated in Fig. 2;

Figure 4:
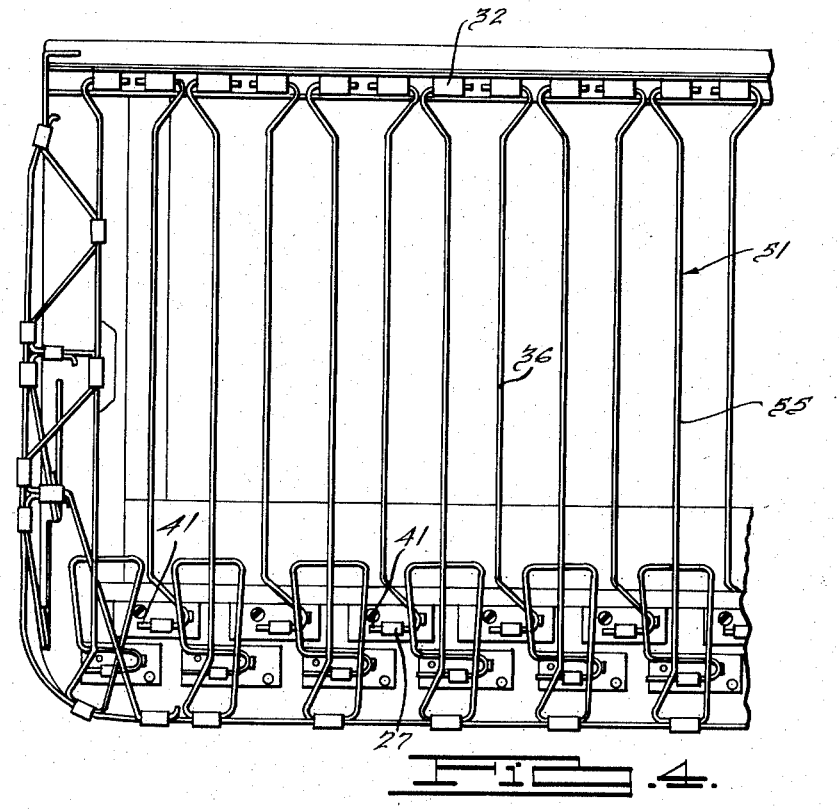
Fig. 4 is a broken plan view of a spring cushion construction, similar to that illustrated in Fig. 2, showing a further form thereof.

Referring to Figs. 1, 2 and 3, a frame 10 is illustrated, having a front cross member 11 and a rear cross member 12. A plurality of spring strips 13 are supported between the front and rear frame members. The spring strips have a load bearing area 14 with a straight front portion 15 and a rear portion 16, the latter being made of oppositely presenting loops 17 which provide resiliency to the rear portion of the spring strip permitting it to assume a desired contour. The front end of the straight portion 15 is deflected laterally at 18 and extended across the front edge at 19. The wire is then deflected rearwardly and downwardly at 21, and then extended laterally at 22 and forwardly and downwardly at 23. The portion 23 is in V-relationship to the downwardly sloping portion 21, as illustrated in Fig. 3. The portion 23 extends laterally at 24 and is looped backwardly at 25, providing a straight end portion 26. The straight end portion extends through a capsule or tunnel 27 in the front frame member 11, with the straight portion 24 resting on the frame portion to prevent the pivotal movement of the resulting supporting end. An upstanding tongue 28 prevents the straight portion 26 from moving out of the capsule 27 after the front portion 24 is rocked down into engagement with the front frame portion.

The rear end of the strip is extended laterally at 31 and is supported within an aperture in an upstanding rubber block 32 which is secured between the flange portions 33 and 34 of the rear frame member. An anchoring tongue 35 permits the upstanding portion of the block to tilt forwardly toward the front frame member when the spring is loaded without being pulled from the support. As clearly illustrated in Fig. 2, the springs 13 are separated a substantial distance, requiring a less number for supporting the load to which the seating area is subjected, which is made possible by the use of the supporting wires 36. The rear end of the wire 36 slopes sharply downwardly at 37, with a right angle end portion 38 supported in an aperture in a rubber block 32. A slight bend is provided in the wire at 39 and the front end of the wire is provided with a right angle extending portion 41 which is supported in a rubber block 32 mounted on a channel member 42 attached to the front frame member 11. A downwardly extending flange 43 on the member 11 engages an offset base portion 44 of the block. The blocks at both ends of the reinforcing wires 36 are capable of deflecting toward each other when the wires 36 are loaded. The wires are offset laterally at 45 and 46 to have the main length thereof disposed substantially on the center line of the blocks. The wires are positioned between the spring strips 13 and aid in supporting the load when the spring strips are sufficiently loaded to deflect to the plane of the wires 36. With this arrangement, a shallow spring structure produces a comfortable seat cushion which may be mounted closer to the floor of the vehicle permitting the top thereof to be lowered. A border wire 47 extends along the front of the springs 13 and is secured thereto by bands 48. The wire extends along the side of the cushion at 49 and is secured to the endmost spring strips 51, the load bearing section of which is straight, as will be described hereinafter. A formed filler wire 52 extends between the side portion 29 of the border wire and the load bearing portion of the spring strip 51, being secured thereto by bands 48. A pair of jack springs 53 and 54 may be provided between the frame member 10 and the side portion 49 of the border wire to provide additional strength against deflection. The upper arms of the jack springs are secured to the border wire by bands 48, the lower ends extending within apertures in the side members of the frame. A spring seat has been provided in this manner made of a minimum length of wire and having a minimum depth while providing a desired contour and support for the load. When a light load is applied to the seat, the load bearing portion of the springs is capable of supporting the load, but when the load becomes substantial supporting wires provided below the load bearing portion of the springs come into play and assist in supporting the excess load. The rubber blocks for supporting the ends of the wire and the load bearing area of the spring project upwardly in a position to be deflected inwardly when the load bearing area of the springs and the wire are supporting the load.

Figure 5:
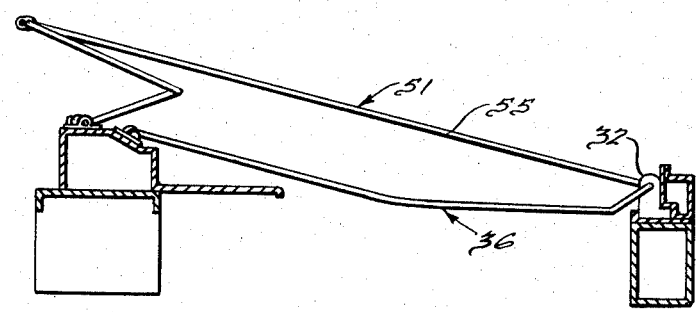
Fig. 5 is a view in side elevation of the structure illustrated in Fig. 4.

Referring to Figs. 4 and 5, a further form of the invention is illustrated, that wherein spring strips 51 are utilized which were disclosed in Fig. 2 as being applied to the end of the frame. The spring strips 51 employ the straight portion 55 as the load bearing area and are the same as the spring strip 13 illustrated in Figs. 1, 2 and 3, with the exception that the loops 17 are omitted therefrom. The employment of the straight portion 55 is made possible by the use of the upwardly extending rubber block 32 which deflects inwardly and permits the desired contour to the load bearing area when loaded and a desired softness to the rear ends. Also, in this arrangement, the ends of the wires 36 are pivotally supported at the front end, the straight portion 41 thereof being mounted in a capsule 27 to permit the pivotal movement thereof. Otherwise the construction is the same as that hereinabove described with regard to Figs. 1, 2 and 3.

What is claimed is:

1. A spring strip made of wire having a load bearing section consisting of a straight length of the wire, offset angular portions of the wire at each end of the load bearing section which are reversely bent at right angles to the load bearing section, the right-angle section at one end being reversely bent parallel to the load bearing length and sloping downwardly therebeneath and further bent at right angles to have a web parallel to the first right-angle section from which a rightangle section extends forwardly and sloped downwardly in V-relation to the reversely extending section to form a resilient support for the end of the spring, and a laterally extending end on the forwardly extending section forming an attaching end.

2. A spring strip made of wire having a load bearing section consisting of a straight length of the wire, offset angular portions of the wire at each end of the load bearing section which are reversely bent at right angles to the load bearing section, the right-angle section at one end being reversely bent parallel to the load bearing length and sloping downwardly therebeneath and further bent at right angles to have a web parallel to the first right-angle section from which a right-angle section extends forwardly and sloped downwardly in V-relation to the reversely extending section to form a resilient support for the end of the spring, said straight load bearing section being located substantially centrally of the end portions.

3. A spring strip made of wire having a load bearing section consisting of a straight length of wire having loops disposed in the rear portion thereof, an offset angular portion at one end which is reversely bent at right angles to the load bearing section and further reversely bent to be parallel to the load bearing length and sloping downwardly therebeneath and further bent at right angles to have a web parallel to the first right-angle section from which a right-angle section extends forwardly and slopes downwardly in V-relation to the reversely extending section to form a resilient support for the end of the spring, said straight portion of the load bearing section being disposed substantially centrally of the resilient support and offset from the center of the loops.

4. A spring strip made of wire having a load bearing section consisting of a straight length of wire having loops disposed in the rear portion thereof, an offset angular portion at one end which is reversely bent at right angles to the load bearing section and further reversely bent to be parallel to the load bearing length and sloping downwardly therebeneath and further bent at right angles to have a web parallel to the first right-angle section from which a right-angle section extends forwardly and slopes downwardly in V-relation to the reversely extending section to form a resilient support for the end of the spring, said straight wire section being centrally disposed to said resilient support.

5. A spring construction comprising a frame having a front and rear rail member, spring strips spanning said rail members, and substantially straight wire elements spanning said rail members independent of and below the load bearing area of the spring strips.

6. A spring construction comprising a frame having a front and rear rail member, spring strips spanning said rail members, and substantially straight wire elements spanning said rail members independent of and below the load bearing area of the spring strips, the rear rail member having upstanding rubber blocks to which the ends of the spring strips and wire elements are alternately secured to the upper end of the blocks to permit the blocks to tilt inwardly of the frame when the spring strips and wire elements are loaded.

7. A spring construction comprising a frame having a front and rear rail member, spring strips spanning said rail members, and wire elements spanning said rail members below the load bearing area of the spring strips, the rear rail member having upstanding rubber blocks to which the ends of the spring strips and wire elements are alternately secured to the upper end of the blocks to permit the blocks to tilt inwardly of the frame when the spring strips and wire elements are loaded, said spring strips having a rectangular coil at the front end forming a V section below the front edge thereof to provide a resilient support therefor.

8. A spring construction comprising a frame having a front and rear rail member, spring strips spaning said rail members, and wire elements spanning said rail members below the load bearing area of the spring strips, the rear rail member having upstanding rubber blocks to which the ends of the spring strips and wire elements are alternately secured to the upper end of the blocks to permit the blocks to tilt inwardly when the spring strips and wire elements are loaded, said spring strips having a rectangular coil at the front end forming a V section below the front edge thereof to provide a resilient support therefor, the forward ends of said wire elements being secured to rubber blocks supported on the front rail member.

9. A spring construction comprising a frame having a front and rear rail member, spring strips spanning said rail members, wire elements spanning said rail members below the load bearing area of the spring strips, the rear rail member having upstanding rubber blocks to which the ends of the spring strips and wire elements are alternately secured to the upper end of the blocks to permit the blocks to tilt inwardly when the spring strips and wire elements are loaded, said spring strips having a rectangular coil at the front end forming a V section below the front edge thereof to provide a resilient support therefor, the forward ends of said wire elements being secured to rubber blocks supported on the front rail member, a border wire extending across the front of the spring strips and along the sides thereof, and a pair of jack springs at each side of the frame supporting the border wire at the side portions thereof.

10. A spring cushion construction comprising a frame having a pair of spaced side members joined to forward and rearward longitudinal members, a plurality of spring strips secured between said longitudinal members, the front end of the strips having a spring section extending therebelow and secured to the frame against pivotal movement, upwardly extending rubber blocks on the members to which the rear ends of the spring strips are secured, wire elements extending between the spring strips and offset therebelow having the rear ends thereof secured in certain of said rubber blocks, and means securing the forward ends of the wire elements to the front longitudinal member.

11. A spring cushion construction comprising a frame having a pair of spaced side members joined to forward and rearward longitudinal members, a plurality of spring strips secured between said longitudinal members, the front end of the strips having a spring section extending therebelow and secured to the frame against pivotal movement, upwardly extending rubber blocks on the members to which the rear ends of the spring strips are secured, wire elements extending between the spring strips and offset therebelow having the rear ends thereof secured in certain of said rubber blocks, and means securing the forward ends of the wire elements to the front longitudinal member, the endmost spring strips having load bearing sections which are straight lengths of wire, the spring strips therebetween having a forward straight portion and a rearward portion which is made of oppositely disposed loops.

12. A spring strip having a load bearing section embodying a straight length of wire, and a rectangular coiled portion forming a V configuration below the front end of the straight length.

13. A spring strip having a load bearing section embodying a straight length of wire, and a rectangular coiled portion forming a V configuration below the front end of the straight length, said straight length being disposed centrally of the coiled portion.

14. A spring strip having a load bearing section embodying a straight length of wire, a rectangular coiled portion forming a V configuration below the front end of the straight length, and a laterally extending end at the rear of the straight portion.

References Cited in the file of this patent

UNITED STATES PATENTS

| | | |
|---|---|---|
| 2,549,768 | Bradley | Apr. 24, 1951 |
| 2,629,430 | Flint | Feb. 24, 1953 |
| 2,629,431 | Flint | Feb. 24, 1953 |
| 2,684,844 | Flint et al. | July 27, 1954 |